United States Patent
Roberson et al.

(10) Patent No.: US 11,487,284 B1
(45) Date of Patent: **\*Nov. 1, 2022**

(54) DRIVER RE-ENGAGEMENT SYSTEM

(71) Applicant: STATE FARM MUTUAL AUTOMOBILE INSURANCE COMPANY, Bloomington, IL (US)

(72) Inventors: Steve Roberson, Normal, IL (US); Brian Mark Fields, Phoenix, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,980

(22) Filed: Jun. 26, 2020

Related U.S. Application Data

(63) Continuation of application No. 15/605,554, filed on May 25, 2017, now Pat. No. 10,732,627.

(51) Int. Cl.
*G05D 1/00* (2006.01)
*B60W 50/14* (2020.01)
(Continued)

(52) U.S. Cl.
CPC ....... *G05D 1/0061* (2013.01); *B60W 50/0098* (2013.01); *B60W 50/082* (2013.01);
(Continued)

(58) Field of Classification Search
CPC ........... B60W 50/0098; B60W 50/082; B60W 50/14; B60W 50/16; B60W 2050/143;
(Continued)

(56) References Cited

U.S. PATENT DOCUMENTS 8,509,982 B2 * 8/2013 Montemerlo ......... B60W 50/14
701/28
8,954,217 B1 * 2/2015 Montemerlo ........ G05D 1/0061
701/26
(Continued)

FOREIGN PATENT DOCUMENTS

KR 100789072 B1 * 12/2007 .......... B60W 50/082
KR 20200128474 A * 11/2020 ............ B60W 50/14
(Continued)

OTHER PUBLICATIONS

Time Magazine 2014 "Autos GM Cars to Use Motion Sensors To Track Distracted Drivers" Sep. 2, 2014 Retrieved from the internet at: URL:http://time.com/3256037/gm-sensors-distracted-driving/ <https://protect-us.mimecast.com/s/MdRvBYsR7n6cb> (2014).
(Continued)

*Primary Examiner* — Dale W Hilgendorf
(74) *Attorney, Agent, or Firm* — Marshall, Gerstein & Borun LLP

(57) ABSTRACT

In a network of autonomous or semi-autonomous vehicles, an alert may be triggered when one of the vehicles switches from autonomous to manual mode. The alert may be communicated to nearby autonomous vehicles so that drivers of those vehicles may become aware of a potentially unpredictable manual driver nearby. Drivers of autonomous vehicles who may have become disengaged (e.g., sleeping, reading, talking, etc.) during autonomous driving may become re-engaged upon noticing the alert. A re-engaged driver may choose to switch his/her own vehicle from autonomous to manual mode in order to appropriately react to an unpredictable nearby manual driver. In additional or alternative embodiments, the alert may be triggered or intensified when indications of impairment of a nearby driver or malfunction of a nearby vehicle are detected.

20 Claims, 4 Drawing Sheets

(51) Int. Cl.
*G08G 1/16* (2006.01)
*B60W 50/00* (2006.01)
*B60W 50/08* (2020.01)
*B60W 50/16* (2020.01)

(52) U.S. Cl.
CPC ............. *B60W 50/14* (2013.01); *G08G 1/162* (2013.01); *B60W 50/16* (2013.01); *B60W 2050/143* (2013.01); *B60W 2420/42* (2013.01); *B60W 2420/52* (2013.01); *B60W 2420/54* (2013.01); *B60W 2554/00* (2020.02)

(58) Field of Classification Search
CPC ......... B60W 2420/40; B60W 2420/42; B60W 2420/52; B60W 2420/54; B60W 2510/0604; B60W 2510/18; B60W 2510/20; B60W 2554/00; B60W 2556/65; G05D 1/0077; G05D 1/0061; G08G 1/162

See application file for complete search history.

(56) References Cited

U.S. PATENT DOCUMENTS

| | | | |
|---|---|---|---|
| 9,147,353 B1 * | 9/2015 | Slusar | G06Q 40/08 |
| 9,311,271 B2 | 4/2016 | Wright | |
| 9,390,451 B1 * | 7/2016 | Slusar | G06Q 40/08 |
| 9,513,632 B1 * | 12/2016 | Gordon | B60W 30/00 |
| 9,633,487 B2 | 4/2017 | Wright | |
| 9,697,733 B1 * | 7/2017 | Penilla | B60L 58/12 |
| 9,809,158 B2 * | 11/2017 | Geller | G08G 1/096791 |
| 10,192,369 B2 | 1/2019 | Wright | |
| 10,198,879 B2 | 2/2019 | Wright | |
| 10,259,452 B2 * | 4/2019 | Gordon | B60W 30/085 |
| 10,289,113 B2 * | 5/2019 | Perkins | B60W 50/082 |
| 10,732,627 B1 * | 8/2020 | Roberson | G05D 1/0061 |
| 10,773,643 B1 * | 9/2020 | Patnaik | G06V 20/58 |
| 2014/0236414 A1 * | 8/2014 | Droz | G08G 1/166 701/28 |
| 2014/0358353 A1 * | 12/2014 | Ibanez-Guzman | B60W 60/0025 701/23 |
| 2015/0134178 A1 * | 5/2015 | Minoiu-Enache | B60W 50/035 701/23 |
| 2017/0192429 A1 * | 7/2017 | Tseng | H04W 4/02 |
| 2017/0234689 A1 * | 8/2017 | Gibson | G05D 1/0061 701/25 |
| 2017/0329329 A1 * | 11/2017 | Kamhi | G05D 1/0061 |
| 2018/0061242 A1 * | 3/2018 | Bavar | G01C 21/3461 |
| 2018/0222491 A1 * | 8/2018 | Miyahara | G07C 5/0825 |
| 2018/0229741 A1 * | 8/2018 | Narita | G05D 1/0061 |
| 2018/0292836 A1 * | 10/2018 | Laur | B60W 30/16 |
| 2018/0329414 A1 * | 11/2018 | Igarashi | G05D 1/0061 |
| 2019/0265700 A1 * | 8/2019 | Honda | B60W 50/14 |
| 2020/0114911 A1 * | 4/2020 | Mitsuhashi | B60W 50/14 |
| 2020/0341465 A1 * | 10/2020 | Yun | G05D 1/0061 |
| 2021/0331690 A1 * | 10/2021 | Pierfelice | H04W 4/40 |

FOREIGN PATENT DOCUMENTS

| | | | | |
|---|---|---|---|---|
| WO | WO-2018116618 A1 * | 6/2018 | | B60R 21/00 |
| WO | WO-2022016457 A1 * | 1/2022 | | B60W 50/14 |

OTHER PUBLICATIONS

CNBC (2017) "Putting Cadillac's self-driving Super Cruise technology to the text" Published Jun. 28, 2017. Retrieved from the Internet at: URL:https://www.cnbc.com/2017/06/28/putting-cadillacs-self-driving-super-cruise-technology-to-the-test.html <https://protect-us.mimecast.com/s/O5zgBeH4ZoWt3>.

* cited by examiner

DRIVER RE-ENGAGEMENT SYSTEM

CROSS-REFERENCE TO RELATED APPLICATIONS

The present application is a continuation of U.S. patent application Ser. No. 15/605,554, filed May 25, 2017, entitled "DRIVER RE-ENGAGEMENT SYSTEM," the disclosure of which is herein incorporated by reference in its entirety.

TECHNICAL FIELD

The present disclosure generally relates to technology for re-engaging a disengaged operator of a vehicle having one or more autonomous features.

BACKGROUND

Individuals have been operating vehicles as a means of transportation for decades. Recently, more and more vehicles have incorporated autonomous or semi-autonomous features, allowing a vehicle to operate with little to no input from an operator or passenger of the vehicle. When a vehicle is in an autonomous or semi-autonomous mode, an operator or passenger may be free to carry on with other activities unrelated to the operation of the vehicle. For instance, an operator or passenger may accomplish other tasks during the operation of the vehicle, such as working, reading, or talking on the phone. Vehicle operators or passengers may even, for example, sleep, watch a movie, or play a game as the vehicle operates autonomously. However, in some instances, manual operation may be more appropriate even for a vehicle with sophisticated autonomous or semi-autonomous features.

SUMMARY

In one aspect, a computer-implemented method for re-engaging a disengaged operator of a vehicle having one or more autonomous features is provided. The method may include receiving, at a processor within a first vehicle operating in an autonomous or semi-autonomous mode, an indication that a nearby second vehicle is operating in a manual mode. The first vehicle and the second vehicle may be part of a vehicle network in which signals may be transmitted and received between vehicles. The method may further include triggering, by the processor, an alert to an operator or passenger of the first vehicle indicating that the second vehicle has switched operational modes, and switching, by the processor, the first vehicle from operating in the autonomous or semi-autonomous mode to operating in a manual mode in response to a selection by the operator or passenger of the first vehicle to switch operational modes.

In another aspect, an electronic device for re-engaging a disengaged operator of a vehicle having one or more autonomous features is provided. The electronic device may include a transceiver configured to communicate data via at least one network connection, a memory configured to store non-transitory computer executable instructions, and a processor configured to interface with the transceiver and the memory, and configured to execute the non-transitory computer executable instructions. The non-transitory computer executable instructions may cause the processor to receive, at a first vehicle in an autonomous or semi-autonomous mode, an indication that a nearby second vehicle is operating in a manual mode. The first vehicle and the second vehicle may be part of a vehicle network in which signals may be transmitted and received between vehicles. The instructions may further cause the processor to trigger an alert to an operator or passenger of the first vehicle indicating that the second vehicle has switched operational modes and switch the first vehicle from operating in the autonomous or semi-autonomous mode to operating in a manual mode in response to a selection by the operator or passenger of the first vehicle to switch modes.

DETAILED DESCRIPTION

Figure 1:
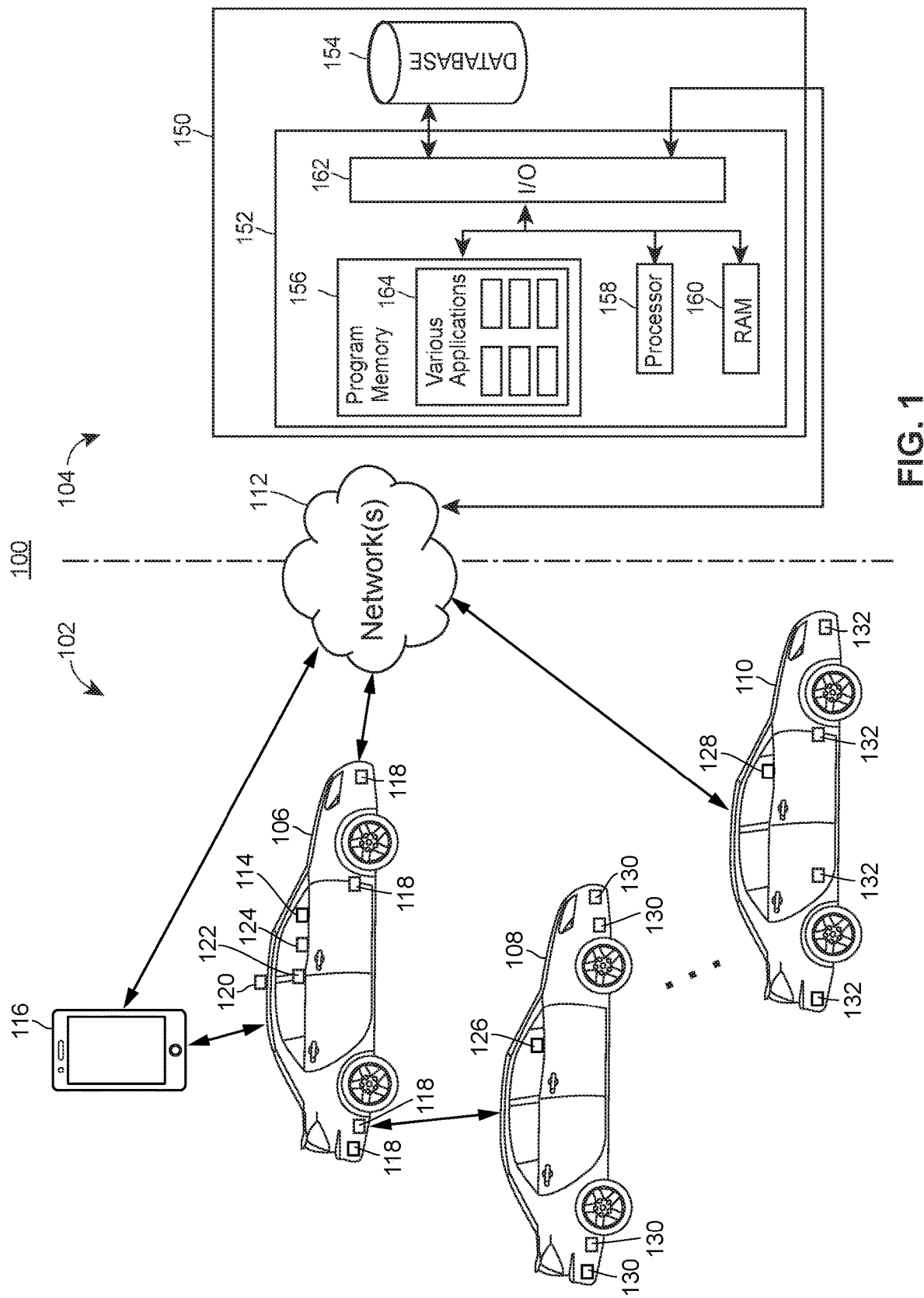
FIG. 1 illustrates a block diagram of an exemplary system for autonomous vehicle operation, in which systems and methods for re-engaging a disengaged operator of a vehicle having one or more autonomous features may be implemented.

The present embodiments may relate to, inter alia, technology for re-engaging a disengaged operator of a vehicle having one or more autonomous features. Within a network of vehicles configured to communicate with one another, a vehicle operating in an autonomous or semi-autonomous mode may receive an indication that another nearby vehicle is operating in a manual operational mode. For an operator and/or passenger of a vehicle operating in the autonomous or semi-autonomous mode, the manual operation of a nearby vehicle may be a safety issue due to the relative unpredictability of manual vehicle operation compared with autonomous vehicle operation.

In response to the indication, an alert may be triggered to indicate to the operator or passenger of the vehicle that a nearby vehicle is operating in a manual mode. The alert may be configured to, for instance, wake a sleeping operator or passenger, or otherwise re-engage the operator or passenger from a disengaged, distracted, or inattentive state. In particular, an operator or passenger may be presented with an option and/or recommendation to switch the vehicle from an autonomous mode to a manual mode. By switching the vehicle to manual mode, the operator or passenger may be capable of more safely operating the vehicle in unpredictable situations, such as, for instance, reacting to the nearby vehicle operating in the manual mode.

The systems and methods therefore offer numerous benefits. In particular, the systems and methods effectively and efficiently trigger an alert to re-engage a vehicle operator who may have become distracted or otherwise disengaged during the autonomous or semi-autonomous operation of a vehicle. In this way, the safety of the operation of the vehicle may be improved. That is, upon noticing the alert, the vehicle operator may determine that switching the vehicle to a manual mode may be necessary to safely and appropriately react to a nearby vehicle operating in a manual mode. In embodiments, alerts may be triggered in real time, as soon as an indication of a nearby vehicle operating in manual mode has been received, allowing a disengaged vehicle operator to become re-engaged quickly, and reducing the time in which the vehicle operator may be too distracted or otherwise inattentive to vehicle operating conditions to switch to a manual mode. It should be appreciated that other benefits are envisioned.

Moreover, the systems and methods discussed herein address a challenge that is particular to autonomous vehicle operation. In particular, the challenge relates to re-engaging a disengaged operator or passenger of an autonomous vehicle in situations when unpredictable conditions may necessitate a switch to a manual operational mode (e.g., to improve the safety of the vehicle). That is, in some instances, such as when nearby vehicles are operating in a manual mode, a human vehicle operator may be more capable of appropriately reacting to unpredictable conditions than an autonomous vehicle operation system. For example, a nearby vehicle in a manual mode may be more likely operate erratically (e.g., due to an impaired operator), or otherwise be malfunctioning (e.g., operating in the manual mode due to a malfunction of the autonomous mode). As another example, a nearby vehicle operating in a manual mode may additionally indicate other conditions (e.g., traffic conditions, weather conditions, road conditions, etc.) which may have caused the operator of the nearby vehicle to switch to a manual operational mode.

Using conventional methods, such conditions might go unnoticed by operators or passengers of a vehicle operating in an autonomous mode, due to distraction or disengagement. That is, when a vehicle is in an autonomous or semi-autonomous mode, an operator or passenger may be free to carry on with other activities unrelated to the operation of the vehicle, and may subsequently be unaware of any conditions that may arise. The systems and methods provided herein offer improved capabilities to solve these problems by dynamically triggering an alert for the operator or passenger based on an indication that a nearby vehicle is operating in a manual mode. Accordingly, a disengaged vehicle operator or passenger may notice the alert, which may persist until dismissal or other reaction by the operator or passenger. Furthermore, the alert may further indicate an option and/or recommendation for the vehicle operator or passenger to switch to a manual mode. Because the systems and methods employ the collection, analysis, and transmission of data associated with autonomous vehicles, the systems and methods are necessarily rooted in computer technology in order to overcome the noted shortcomings that specifically arise in the realm of autonomous vehicle operation.

Similarly, the systems and methods provide improvements in a technical field, namely, autonomous vehicle operation. Instead of the systems and methods merely being performed by hardware components using basic functions, the systems and methods employ complex steps that go beyond the mere concept of simply retrieving and combining data using a computer. In particular, the hardware components control the operation of the vehicle, and trigger alerts to re-engage a disengaged vehicle operator or passenger when safety conditions (e.g., a nearby manual operator) indicate that a switch to a manual operational mode may enable safer operation of the vehicle, among other functionalities.

According to implementations, the systems and methods may support a dynamic, real-time or near-real-time analysis of any captured, received, and/or detected data. In particular, an electronic device in a vehicle may receive an indication that a nearby vehicle is operating in a manual mode in real-time or near real-time, and may automatically and dynamically trigger an alert to the operator or passenger of the vehicle. In this regard, any operator or passenger who receives an alert is afforded the benefit of accurate and relevant data, and may, for instance, quickly take steps to react to a safety condition (e.g., a nearby manual operator) indicated by the alert.

FIG. 1 depicts a block diagram of an exemplary system 100 for autonomous vehicle operation, in which systems and methods for re-engaging a disengaged operator of a vehicle having one or more autonomous features may be implemented. The high-level architecture illustrated in FIG. 1 may include both hardware and software applications, as well as various data communications channels for communicating data between the various hardware and software components, as is described below. The system 100 may be roughly divided into front-end components 102 and back-end components 104.

The front-end components 102 may obtain information regarding a vehicle 106 (e.g., a car, truck, motorcycle, etc.), the surrounding environment, and other nearby vehicles 108, 110, and may communicate with the back-end components 104 via a network 112. The front-end components 102 may include a computer 114 and/or mobile device 116 associated with the vehicle 106, which on-board computer 114 and/or mobile device 116 may utilize the obtained information to autonomously or semi-autonomously operate the vehicle 106. While the vehicle 106 is operating in an autonomous or semi-autonomous operational mode, the on-board computer 114 and/or mobile device 116 may, in certain conditions, trigger an alert to re-engage a disengaged operator or passenger of the vehicle 106. For instance, the on-board computer 114 and/or mobile device 116 may receive an indication that a nearby vehicle such as vehicle 108 or vehicle 110 is operating in a manual mode, operating erratically, and/or malfunctioning. In such conditions, re-engagement of an operator or passenger of the vehicle 106 may be appropriate. In embodiments, the on-board computer 114 and/or mobile device 116 may further provide a recommendation or option for an operator or passenger of the vehicle 106 to switch the operational mode of the vehicle 106 to a manual mode in such conditions.

The front-end components 102 may further include one or more sensors 118 associated with the vehicle 106 that may communicate sensor data to the on-board computer 114 and/or the mobile device 116. Additionally, the front-end components 102 may include a communication component 120 associated with the vehicle 106 and configured to interface with the on-board computer 114 and/or the mobile device 116 to transmit and receive information from external sources, such as back-end components 104 and/or other vehicles 108, 110. The front-end components 102 may further include an internal audio component 122 and/or an internal display component 124 disposed within the vehicle 106 that may be configured to respectively sound or display various alerts generated by the on-board computer 114 and/or the mobile device 116 for re-engaging a disengaged operator or passenger of the vehicle 106. Additionally, the front-end components may include a user-input device (not shown) disposed within the vehicle 106 that may be configured to receive instructions or information from the vehicle operator. Of course, additional or alternative front-end components 102 for performing similar or different functions may be included in various embodiments. Moreover, any combination of the on-board computer 114, internal audio component 122, internal display component 124, and/or user-input device may be incorporated into a single device in various configurations.

Additionally, the other nearby vehicles 108, 110 may include front-end components (not shown) similar or analogous to any of the front-end components 102 of vehicle 106 discussed herein, and may in some configurations include additional or alternative front-end components. For instance, just as the front-end components 102 of vehicle 106 may include a computer 114 and/or mobile device 116, the front-end components of vehicle 108 may include a mobile device and/or on-board computer 126, and the front-end components of vehicle 110 may include a mobile device and/or on-board computer 128 as well. While only one mobile device and/or on-board computer 126, 128 is shown associated with each other nearby vehicle 108, 110, in embodiments, one or more of vehicles 108, 110 may include, for instance, both a mobile device and an on-board computer (just as vehicle 106 may include both an on-board computer 114 and a mobile device 116), or multiple mobile devices and/or on-board computers 126, 128. Similarly, just as the front-end components 102 of vehicle 106 may include one or more sensors 118, the front-end components of vehicle 108 may include one or more sensors 130 and the front-end components of vehicle 110 may include one or more sensors 132. Additionally, while one or more of vehicles 108, 110 may include autonomous or semi-autonomous operational features/modes, in some embodiments one or more of vehicles 108, 110 may be vehicles without autonomous or semi-autonomous operational features/modes (e.g., capable of operating only in a manual mode). Of course, vehicles without autonomous or semi-autonomous operational features may still communicate with vehicles, such as vehicle 106 having autonomous or semi-autonomous operational features/modes. Furthermore, it should be appreciated that while only two other nearby vehicles 108, 110 are depicted in FIG. 1, various embodiments may include any number of other nearby vehicles 108, 110, with any number of front-end and/or back-end components.

In embodiments, the front-end components 102 of vehicle 106 may communicate information to the back-end components 104, e.g., via the network 112. For example, at least one of the on-board computer 114 or the mobile device 116 may communicate with the back-end components 104 via the network 112 to allow the back-end components 104 to record collected sensor data and/or any other information obtained by the front-end components regarding the vehicle 106, the surrounding environment, and/or other nearby vehicles 108, 110. The network 112 may include a proprietary network, a secure public internet, a virtual private network, and/or some other type of network, such as dedicated access lines, plain ordinary telephone lines, satellite links, cellular data networks, combinations of these and/or other types of networks. The network 112 may utilize one or more radio frequency communication links to communicatively connect to the vehicle 106, e.g., utilize wireless communication links to communicatively connect with on-board computer 114 and mobile device 116, respectively. Where the network 112 comprises the Internet or other data packet network, data communications may take place over the network 112 via an Internet or other suitable data packet communication protocol. In some arrangements, the network 112 may additionally or alternatively include one or more wired communication links or networks.

Generally speaking, the on-board computer 114 may be, for instance, a general-use computer capable of performing many functions relating to vehicle operation or a dedicated computer for autonomous vehicle operation, in various embodiments. Further, the on-board computer 114 may be installed by the manufacturer of the vehicle 106 or as an aftermarket modification or addition to the vehicle 106. The mobile device 116 may be, for instance, a general-use personal computer, cellular phone, smart phone, tablet computer, smart watch, wearable electronics, a dedicated vehicle monitoring or control device, or any other suitable mobile device. Either or both of the on-board computer 114 and/or the mobile device 116 may run various applications for collecting, generating, processing, analyzing, transmitting, receiving, and/or acting upon data associated with the vehicle 106 (e.g., sensor data; location data; operator or passenger data including selections, dismissals, and/or settings by operators or passengers; autonomous operation feature settings; autonomous operational modes; control decisions made by the autonomous operation features; etc.), the vehicle environment, and/or other nearby vehicles such as vehicles 108 and/or 110 (e.g., location data, autonomous operation feature settings, autonomous operational mode, indications of erratic operation, vehicle malfunction data, etc. associated with other nearby vehicles 108, 110). As discussed above, either or both of the on-board computer 114 and/or the mobile device 116 may communicate with the network 112 over respective links. Additionally or alternatively, the on-board computer 114 or the mobile device 116 may communicate with one another directly over a link.

In particular, the on-board computer 114 and/or mobile device 116 may directly or indirectly control the operation of the vehicle 106 according to various autonomous operation features. The autonomous operation features may include software applications or modules implemented by the on-board computer 114 and/or mobile device 116 to generate and implement control commands to control the operation of the vehicle 106 (e.g., steering, braking, throttle, etc.). To facilitate such control, the on-board computer 114 and/or mobile device 116 may be communicatively connected to control components of the vehicle 106 by various electrical or electromechanical control components (not shown). Control commands may be generated by the on-board computer 114 and/or mobile device 116 and may be communicated to the control components of the vehicle 106 to effect a control action. In embodiments involving fully autonomous vehicles and/or fully autonomous operational modes, the vehicle 106 may be operable only through such control components. In other embodiments (e.g., involving semi-autonomous vehicles and/or semi-autonomous operational modes), the control components may be disposed within or supplement other vehicle operator control components (not shown), such as steering wheels, accelerator or brake pedals, or ignition switches controlled by an operator of the vehicle 106.

Although only one on-board computer 114 and only one mobile device 116 are depicted in FIG. 1, it should be understood that some embodiments may include, for instance, a plurality of on-board computers 114 (which may be installed at one or more locations within the vehicle 106) and/or a plurality of mobile devices 116. In embodiments, such a plurality of on-board computers 114 or mobile devices 116 may perform functionalities described herein as being performed by just one on-board computer 114 or just one mobile device 116. Additionally, in some embodiments the mobile device 116 may supplement the functions performed by the on-board computer 114 described herein, or vice versa. In other embodiments, the on-board computer 114 and the mobile device 116 may be integrated into a single device, or either may perform the functions of both. In some embodiments or under certain conditions, on-board computer 114 or mobile device 116 may function as thin-client devices that outsource some or most of the processing to the back-end components 104.

The on-board computer 114 and/or mobile device 116 disposed at the vehicle 106 may communicatively interface with the one or more on-board sensors 118. The one or more on-board sensors 118 may detect conditions associated with the vehicle 106 and/or associated with the environment in which the vehicle 106 is operating, and may collect data indicative of the detected conditions. In particular, data detected by the sensors 118 may be communicated to the on-board computer 114 or the mobile device 116 for use in operator/passenger re-engagement and/or autonomous vehicle operation. The sensors 118 may include, for instance, one or more of a GPS unit, a radar unit, a LIDAR unit, an ultrasonic sensor, an infrared sensor, an inductance sensor, a camera, an accelerometer, a tachometer, or a speedometer. Some of the sensors 118 (e.g., radar, LIDAR, or camera units) may actively or passively scan the vehicle environment for obstacles (e.g., other vehicles such as vehicle 108 or vehicle 110, buildings, pedestrians, etc.), roadways, lane markings, signs, or signals. Other of the sensors 118 (e.g., GPS, accelerometer, or tachometer units) may provide data for determining the location or movement of the vehicle 106. Other sensors 118 may be directed to the interior or passenger compartment of the vehicle 106, such as cameras, microphones, pressure sensors, thermometers, or similar sensors to monitor the vehicle operator and/or passengers within the vehicle 118. For instance, such interior sensors 118 may be used to detect an indication of a selection or a dismissal (e.g., in response to an alert) by an operator or passenger of the vehicle 106. Of course, other embodiments may include additional or alternative sensors 118.

In some configurations, at least some of the on-board sensors 118 may be removably or fixedly disposed at various locations on the vehicle 106. Additionally or alternatively, at least some of the on-board sensors 118 may be incorporated within or connected to the on-board computer 114. Still additionally or alternatively, in some configurations, at least some of the on-board sensors 118 may be included on or within the mobile device 116.

Additionally, the on-board computer 114 and/or mobile device 116 disposed at the vehicle 106 may communicatively interface with the one or more communication components 120. The one or more communication components 120 may be configured to transmit information to and receive information from the back-end components 104 and/or from other external sources, such as other vehicles 108, 110 and/or infrastructure or environmental components (not shown) disposed within the environment of the vehicle 106. The one or more communication components 120 may include one or more wireless transmitters or transceivers operating at any desired or suitable frequency or frequencies. Different wireless transmitters or transceivers may operate at different frequencies and/or by using different protocols, if desired.

In an example, the on-board computer 114 may operate in conjunction with a communication component 120 that is disposed at the vehicle 106 for sending or receiving information to and from the server 150 via the network 112, such as over one or more radio frequency links or wireless communication channels which support the first communication protocol and/or a second communication protocol. Additionally or alternatively, the mobile device 116 may include a respective communication component (not shown) for sending or receiving information to and from the server via the network 112, such as over one or more radio frequency links or wireless communication channels supporting a first communication protocol (e.g., GSM, CDMA, LTE, one or more IEEE 802.11 Standards such as Wi-Fi, WiMAX, BLUETOOTH, etc.). In some embodiments, the on-board computer 114 may operate in conjunction with the mobile device 116 to utilize the communication component of the mobile device 116 to deliver information to the back-end components 104. In some embodiments, the on-board computer 114 may operate in conjunction with the mobile device 116 to utilize the communication component 120 of the vehicle 106 to deliver information to the back-end components 104. In some embodiments, one or more communication components 120 may be utilized by both the on-board computer 114 and/or the mobile device 116 to communicate with the back-end components 104. Accordingly, either one or both of the on-board computer 114 or mobile device 116 may communicate with the network 112 over various links. Additionally, in some configurations, the on-board computer 114 and/or mobile device 116 may communicate with one another directly over a wireless or wired link.

Moreover, the on-board computer 114 and/or the mobile device 116 of the vehicle 108 may communicate with respective on-board computers and/or mobile devices 126, 128 disposed at the one or more other vehicles 108, 110, either directly or via the network 112. In embodiments, the on-board computer 114 and/or the mobile device 116 disposed at the vehicle 106 may communicate with the on-board computers and/or mobile devices 128 of vehicle 110 via the network 112 and one or more communication components 120 by using one or more suitable wireless communication protocols (e.g., GSM, CDMA, LTE, one or more IEEE 802.11 Standards such as Wi-Fi, WiMAX, BLUETOOTH, etc.). As another example, the on-board computer 114 may communicate with a particular other vehicle 108 directly in a peer-to-peer (P2P) manner via one or more of the communication components 120 and a direct wireless communication link which may utilize, for example, a Wi-Fi direct protocol, a BLUETOOTH or other short range communication protocol, an ad-hoc cellular communication protocol, or any other suitable wireless communication protocol. In some embodiments, the on-board computer 114 and/or the mobile device 116 may communicate with respective on-board computers and/or mobile devices 126, 128, either directly or via the network 112, without utilizing the communication component 120. In these embodiments, each of the on-board computer 114, mobile device 116, and/or on-board computers and/or mobile devices 126, 128 may include a set of transceivers or other components configured to support the transmission and receipt of data.

The on-board computer 114 and/or mobile device 116 may utilize information about other vehicles 108, 110 received by the one or more communication components 120 to supplement the data received from the sensors 118 for implementing driver re-engagement and/or autonomous operation features. For instance, the communication component 120 may receive an indication that another nearby vehicle (e.g., vehicle 108 and/or vehicle 110) has switched modes from autonomous to manual mode, based on which indication an alert may be triggered by an application of the on-board computer 114 and/or mobile device 116 for re-engagement of an operator or passenger of the vehicle 106. Similarly, the communication component 120 may receive an indication that another nearby vehicle such as vehicle 108 and/or vehicle 110 may be operating erratically and/or malfunctioning, based on which indication an elevated alert may be triggered by an application of the on-board computer 114 and/or mobile device 116 for re-engagement of an operator or passenger of the vehicle 106. As another example, in some embodiments the communication component 120 may receive information that a nearby vehicle such as vehicle 108 and/or 110 ahead of the vehicle 106 is reducing speed, which may allow adjustments in the autonomous operation of the vehicle 106 to be made by the on-board computer 114, mobile device 116, and/or back-end server 150.

In some embodiments, the one or more communication components 120 may be removably or fixedly disposed at various locations within or external to the vehicle 106. Additionally or alternatively, one or more communication component 120 may be incorporated within or connected to the on-board computer 114. Still additionally or alternatively, in some configurations, one or more communication component 120 may be included on or within the mobile device 116.

Additionally, the on-board computer 114 and/or mobile device 116 disposed at the vehicle 106 may communicatively interface with one or more internal audio components 122 (e.g., a speaker system or other audio device within the vehicle 106). In particular, the internal audio component 122 may be configured to sound various alerts triggered by the on-board computer 114 and/or mobile device 116 for re-engaging a disengaged operator or passenger of the vehicle 106 in certain conditions. For instance, the internal audio component 122 may be configured to sound an alert when the on-board computer 114 and/or mobile device 116 receives an indication that a nearby vehicle 108, 110 has switched from an autonomous operational mode to a manual operational mode. As another example, the internal audio component 122 may be configured to sound an elevated (e.g., louder, or more frequent) alert in certain instances, such as when the on-board computer 114 and/or mobile device 116 receives an indication a nearby vehicle 108, 110 is operating erratically and/or otherwise malfunctioning. In embodiments, the internal audio component 122 may be configured to continue to sound the alert until the on-board computer 114 and/or mobile device 116 receives an indication of dismissal from the operator or passenger of the vehicle 106. For instance, the sensors 118 may detect a motion or voice command of an operator or passenger of the vehicle 106 indicating dismissal of the alert and may send an indication to the on-board computer 114 and/or mobile device 116, which may in turn cause the internal audio component 122 to cease the alert.

In various configurations, the one or more internal audio components 122 may be removably or fixedly disposed at various locations within the vehicle 106. Additionally or alternatively, the internal audio component 122 may be incorporated within or connected to the on-board computer 114. Still additionally or alternatively, in some configurations, the internal audio component 122 may be included on or within the mobile device 116.

In embodiments, the on-board computer 114 and/or mobile device 116 disposed at the vehicle 106 may communicatively interface with one or more internal display components 124. The one or more internal display component 124 may be, for instance, one or more screens or lights within the vehicle 106, configured to be visible to an operator or passenger of the vehicle 106. In particular, the internal display component 124 may display various alerts for re-engaging a disengaged operator or passenger of the vehicle 106. For instance, the internal display component 124 may be configured to display an alert when the on-board computer 114 and/or mobile device 116 receives an indication that a nearby vehicle 108, 110 has switched from an autonomous operational mode to a manual operational mode. As another example, the internal display component 124 may be configured to display an elevated (e.g., brighter, flashing, more frequent, etc.) alert in certain instances, such as when the on-board computer 114 and/or mobile device 116 receives an indication a nearby vehicle 108, 110 is operating erratically and/or otherwise malfunctioning. In embodiments, the internal display component 124 may be configured to continue to sound the alert until the on-board computer 114 and/or mobile device 116 receives an indication of dismissal from the operator or passenger of the vehicle 106. For instance, the sensors 118 may detect a motion or voice command of an operator or passenger of the vehicle 106 indicating dismissal of the alert and may send an indication to the on-board computer 114 and/or mobile device 116, which may in turn cause the internal display component 124 to cease the alert. As another example, in other embodiments, the dismissal may be indicated via a user interface of the on-board computer 114 and/or mobile device 116. In some configurations, the internal display component 124 may also function as a user interface component of the on-board computer 114 and/or mobile device 116.

In various configurations, the one or more internal display component 124 may be removably or fixedly disposed at various locations within the vehicle 106. Additionally or alternatively, the internal display component 124 may be incorporated within or connected to the on-board computer 114. Still additionally or alternatively, in some configurations, the internal display component may be included on or within the mobile device 116. Additionally, while some embodiments may include both an internal audio component 122 and an internal display component 124 for sounding/displaying alerts, other embodiments may include just one of the internal audio component 122 and/or internal display component 124 for sounding/displaying alerts.

In some embodiments, the on-board computer 114 and/or mobile device 116 disposed at the vehicle 106 may communicatively interface with one or more user-input device (not shown) for receiving instructions or information from the vehicle operator, such as settings, selections, acknowledgements, dismissals, etc. In particular, the user-input device may be configured to receive indications from an operator or passenger of the vehicle 106. The user-input device (not shown) may include a "soft" keyboard (displayed on, e.g., the internal display component 124, or on a screen of the on-board computer 114 and/or mobile device 116), an external hardware keyboard communicating via a wired or a wireless connection (e.g., a BLUETOOTH, or other short range communication protocol, keyboard), an external mouse, a microphone, or any other suitable user-input device. The user-input device (not shown) may also include a microphone capable of receiving user voice input. In various configurations, the one or more user-input device may be removably or fixedly disposed at various locations within the vehicle 106. Additionally or alternatively, the user-input device may be incorporated within or connected to the on-board computer 114. Still additionally or alternatively, in some configurations, the user-input device may be included on or within the mobile device 116.

As discussed above, the front-end components 102 of the system 100 may communicate with one or more back-end components 104. The back-end components 104 may include one or more servers 150. As shown in FIG. 1, the server 150 may include a controller 152 that may be operatively connected to the one or more databases 154 via a link, which may be a local or a remote link. The one or more databases 154 may be adapted to store data related to, for instance, driver re-engagement features, autonomous operation features, and/or communication features of the vehicle 106. It should be noted that, while not shown, additional databases may be linked to the controller 152 in a known manner. For example, separate databases may be used for various types of information, such as autonomous operation feature information, vehicle accidents, road conditions, vehicle operation information, and/or any other suitable types of information. Additional databases (not shown) may be communicatively connected to the server 150 via the network 112, such as databases maintained by third parties (e.g., weather, construction, mapping, or road network databases). The controller 152 may include one or more program memories 156, one or more processors 158 (which may be, e.g., microcontrollers and/or microprocessors), one or more random-access memories (RAMs) 160, and an input/output (I/O) circuit 162, all of which may be interconnected via an address/data bus.

The server 150 may further include a number of various software applications 164 stored in the program memory 156. Generally speaking, the applications may perform one or more functions related to, inter alia, autonomous or semi-autonomous operation of the vehicle 106, re-engagement of an operator or passenger of the vehicle 106, and/or communications between the vehicle 106 and external sources, such as, e.g., other vehicles 108, 110. For example, one or more of the applications 164 may perform at least a portion of any of the methods described herein, such as, e.g., method 300.

The various software applications on the remote computing system 150 may include, for example, an application for supporting autonomous and/or semi-autonomous vehicle operations and/or one or more other applications which may support vehicle operations (whether autonomous, semi-autonomous, or manual); an application for periodically or constantly receiving and/or processing data indicative of the location of other nearby vehicles 108, 110 to determine the proximity of other nearby vehicles 108, 110 to vehicle 106; an application for periodically or constantly requesting, receiving and/or processing data indicative of the operational mode (e.g., autonomous, semi-autonomous, or manual) and/or switches in the operational mode of other nearby vehicles 108, 110; an application for periodically or constantly receiving data indicative of the operational behavior (e.g., indicative of erratic operation and/or malfunction) and/or changes in the operational behavior of other nearby vehicles 108, 110; an application for triggering alerts for an operator and/or passenger of the vehicle 106 based on indications that other nearby vehicles 108, 110 are operating in a manual mode and/or switching operational mode, are operating erratically, and/or are otherwise malfunctioning; an application for displaying a user interface for conveying information to and/or receiving input from an operator and/or passenger of the vehicle 106; a vehicle monitoring application for receiving sensor data indicative of the operational mode and/or operational behavior of the vehicle 106; an application for prompting an operator or passenger to change the operational mode of the vehicle 106 and/or automatically changing the operational mode of the vehicle 106 in certain conditions; an environmental monitoring application for receiving data indicative of conditions in which the vehicle 106 is operating, and/or a real-time communication application for communicating information and/or instructions to the front-end components 102, to other vehicles 108, 110, and/or to other external computing systems. Of course, this is not an exhaustive list of the applications 164, and various embodiments and configurations may include additional and/or alternative applications 164.

The various software applications 164 may be executed on the same computer processor 158 or on different computer processors. Although six applications 164 are depicted in FIG. 1, it will be understood that there may be any number of software applications 164. Further, two or more of the various applications 164 may be integrated as an integral application, if desired.

It should be appreciated that although the server 150 is illustrated as a single device in FIG. 1, one or more portions of the server 150 may be implemented as one or more storage devices that are physically co-located with the server 150, or as one or more storage devices utilizing different storage locations as a shared database structure (e.g. cloud storage). In some embodiments, the server 150 may be configured to perform any suitable portion of the processing functions remotely that have been outsourced by one or more of on-board computer 114 and/or mobile device 116. In such embodiments, the server 150 may receive and process the data and send an indication to on-board computer 114 and/or mobile device 116, and/or take other actions.

Moreover, although only one processor 158 is shown, the controller 152 may include multiple processors 158. Similarly, the memory of the controller 152 may include multiple program memories 156 and multiple RAMs 160. Although the I/O circuit 162 is shown as a single block, it should be appreciated that the I/O circuit 162 may include a number of different types of I/O circuits. The program memory 156 and RAM 160 may be implemented as semiconductor memories, magnetically readable memories, optically readable memories, or biologically readable memories, for example. Generally speaking, the program memory 156 and/or the RAM 160 may respectively include one or more non-transitory, computer-readable storage media. The controller 152 may also be operatively connected to the network 112 via a link.

Additionally, the other nearby vehicles 108, 110 may include back-end components (not shown) similar or analogous to any of the back-end components 104 of vehicle 106, and may in some configurations include additional or alternative back-end components. Additionally, in some embodiments, one or more of nearby vehicles 108, 110 may communicate with the same server 150. For simplicity, however, the back-end components of nearby vehicles 108, 110 are not shown in FIG. 1.

Figure 2:
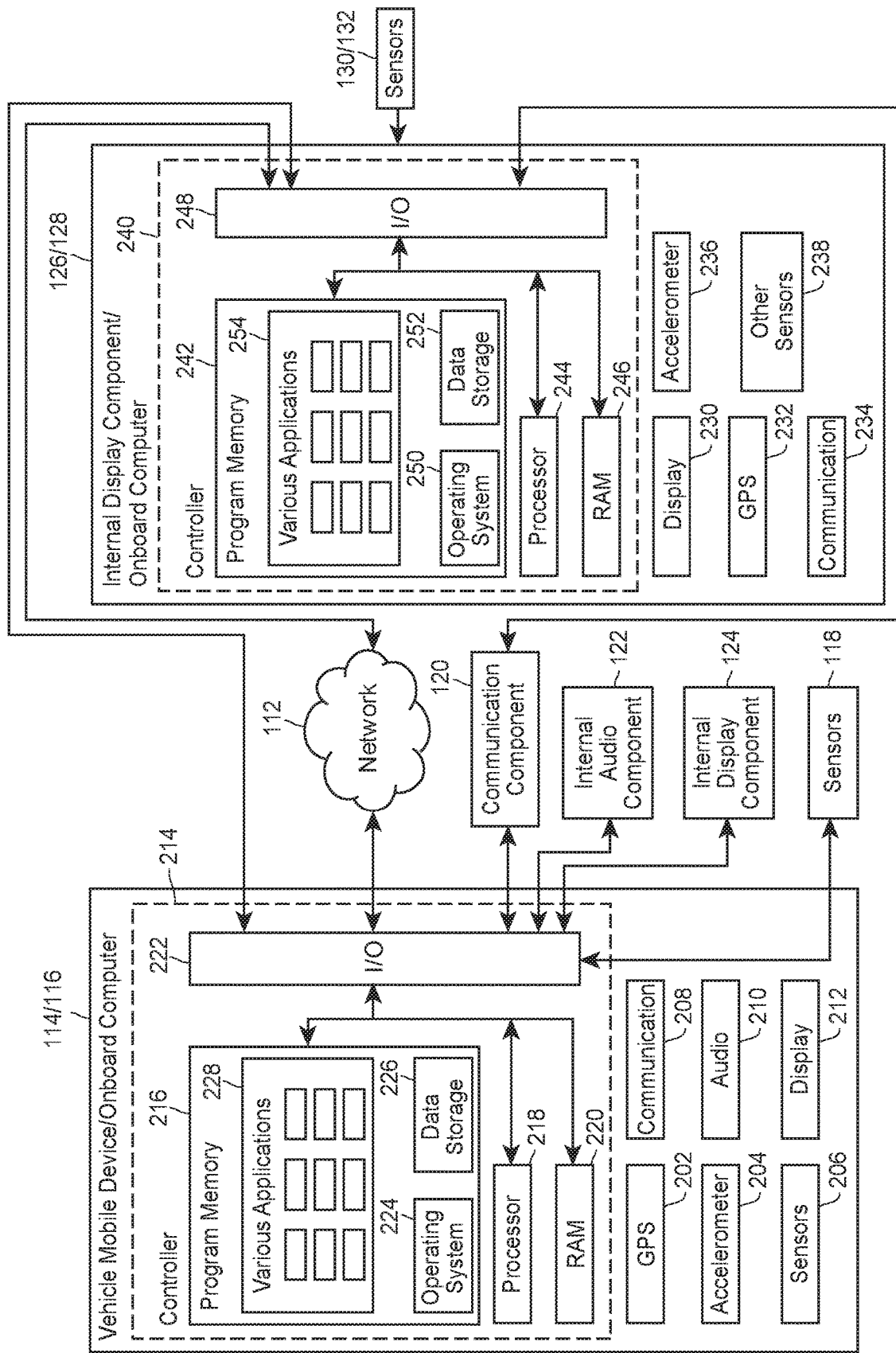
FIG. 2 illustrates a block diagram of an exemplary computer or mobile device associated with a vehicle and in communication with another exemplary mobile device or on-board computer associated with another nearby vehicle, in which systems and methods for re-engaging a disengaged operator of a vehicle having one or more autonomous features may be implemented.

FIG. 2 illustrates a block diagram of the exemplary on-board computer/mobile device 114/116 associated with the vehicle 106 and in communication (as discussed in greater detail above) with one or more exemplary on-board computer/mobile devices 126, 128 associated with one or more nearby vehicles 108, 110, consistent with the system 100, in which systems and methods for re-engaging a disengaged operator of a vehicle having one or more autonomous features may be implemented. The on-board computer 114 and/or mobile device 116 may include a GPS unit 202, an accelerometer 204, one or more sensors 206, a communication unit 208, an audio unit 210, a display unit 212, and/or a controller 214.

The GPS unit 202 may be disposed at the on-board computer 114 and/or mobile device 116 and may collect data indicating the location of the on-board computer 114, the mobile device 116, and/or (e.g., by proxy) the vehicle 106. This location information may be used, for instance, to determine the proximity of the vehicle 106 to other vehicle such as vehicle 108 and/or vehicle 110. Certain alerts may be generated for an operator and/or passenger of vehicle 106 based on the proximity (e.g., within a certain distance threshold) of other vehicles 108, 110 operating in a manual mode, operating erratically, and/or malfunctioning. In some embodiments, such alerts may be ceased when other vehicles 108, 110 are determined to be further away (e.g., outside of a certain distance threshold) from vehicle 106. In additional or alternative instances, the indications of location generated by the GPS unit 202 may be used for autonomous operational features and/or mapping features of the vehicle 106. Of course, additional or alternative uses of the GPS unit 202 may be envisioned. Moreover, in some embodiments the GPS unit 202 may be a separate device disposed within or external to the vehicle 106, and interfacing with the on-board computer 114 and/or mobile device 116.

The accelerometer 204 may be disposed at the on-board computer 114 and/or mobile device 116 and may collect data indicating the acceleration of the on-board computer 114, the mobile device 116, and/or (e.g., by proxy) the vehicle 106. The acceleration information may be used, for instance, to determine whether the vehicle 106 is, for instance, operating erratically and/or malfunctioning. Of course, additional and/or alternative uses of the accelerometer 204 may be envisioned. Moreover, in some embodiments the accelerometer 204 may be a separate device disposed within or external to the vehicle 106, and interfacing with the on-board computer 114 and/or mobile device 116.

In general, the sensors 206 may be disposed at the on-board computer 114 and/or mobile device 116 and may perform similar functions (e.g., monitoring operator or passenger behavior, detecting operator or passenger feedback, monitoring the environment outside of the vehicle 106, etc.) as the sensors 118 discussed above. Similarly, the communication unit 208 may be disposed at the on-board computer 114 and/or mobile device 116 and may perform similar functions (e.g., transmitting and receiving information from external sources, etc.) as the communication component 120 discussed above, the audio unit 208 may be disposed at the on-board computer 114 and/or mobile device 116 and may perform similar functions (e.g., sounding various alerts, etc.) as the internal audio component 122 discussed above, and display unit 212 may be disposed at the on-board computer 114 and/or mobile device 116 and may perform similar functions (e.g., displaying various alerts, displaying a user interface, etc.) as the internal display component 124 discussed above. The sensors 206, communication unit 208, audio unit 210, and/or display unit 212 may supplement and/or replace one or more of the corresponding sensors 118, communication component 120, internal audio component 122, and/or internal display component 124.

In some embodiments, a vibrate unit (not shown) may additionally be disposed at the on-board computer 114 and/or mobile device 116, which vibrate unit may be configured to alert the vehicle operator using a vibration or other haptic feedback. For instance, the vibrate unit may generate various alerts for re-engaging a disengaged operator or passenger of the vehicle 106. As one example, an operator or passenger of the vehicle 106 holding the on-board computer 114 and/or mobile device 116 may feel the vibration or other haptic feedback and notice the alert. For instance, the vibrate unit may be configured to vibrate when the on-board computer 114 and/or mobile device 116 receives an indication that a nearby vehicle 108, 110 has switched from an autonomous operational mode to a manual operational mode. As another example, the vibrate unit may be configured to generate an elevated (e.g., more frequent, greater amplitude, etc.) alert in certain instances, such as when the on-board computer 114 and/or mobile device 116 receives an indication a nearby vehicle 108, 110 is operating erratically and/or otherwise malfunctioning. In embodiments, the vibrate unit may be configured to continue to persist in generating the alert until the on-board computer 114 and/or mobile device 116 receives an indication of dismissal from the operator or passenger of the vehicle 106. For instance, the sensors 118 and/or sensors 206 may detect a motion or voice command of an operator or passenger of the vehicle 106 indicating dismissal of the alert and may send an indication to the on-board computer 114 and/or mobile device 116, which may in turn cause the vibrate unit to cease the alert. As another example, in other embodiments, the dismissal may be indicated via a user interface of the on-board computer 114 and/or mobile device 116.

The controller 214 may include a program memory 216, one or more processors (e.g., microprocessors) 218, RAM 220, and an I/O circuit 222, all of which may be interconnected via an address/data bus. The program memory 216 may include an operating system 224, a data storage 226, and/or a plurality various software applications 228. The operating system 224, for example, may include one of a plurality of general purpose or mobile platforms, such as the Android™, iOS®, or Windows® systems, developed by Google Inc., Apple Inc., and Microsoft Corporation, respectively. Alternatively, the operating system 224 may be a custom operating system designed for autonomous vehicle operation using the on-board computer 114 and/or mobile device 116. The data storage 226 may include data such as user profiles and preferences, application data and/or routine data for the various applications 228, and other data related to driver re-engagement features, autonomous operation features, and/or communication features. In some embodiments, the controller 214 may also include, or otherwise be communicatively connected to, other data storage mechanisms (e.g., one or more hard disk drives, optical storage drives, solid state storage devices, etc.) residing within the vehicle 106.

In embodiments, the controller 214 may include multiple program memories 216, processors 218 and/or RAMs 220. Moreover, although FIG. 2 depicts the I/O circuit 222 as a single block, the I/O circuit 222 may include a number of different types of I/O circuits. The controller 214 may implement the program memories 216 and/or the RAMs 220 as semiconductor memories, magnetically readable memories, or optically readable memories, for example. Generally speaking, the program memories 216 and/or the RAMs 220 may respectively include one or more non-transitory, computer-readable storage media. The one or more processors 218 may be adapted and configured to execute any of the various software applications 228 residing in the program memory 216, in addition to other software applications/routines.

Generally speaking, the applications 228 may perform one or more functions related to, inter alia, autonomous or semi-autonomous operation of the vehicle 106, re-engagement of an operator or passenger of the vehicle 106, and/or communications between the vehicle 106 and external sources, such as, e.g., the back-end components 104 and/or other vehicles 108, 110. For example, one or more of the applications 228 may perform at least a portion of any of the methods described herein, such as, e.g., method 300.

The various software applications 228 may include, for example, an application for supporting autonomous and/or semi-autonomous vehicle operations and/or one or more other applications which may support vehicle operations (whether autonomous, semi-autonomous, or manual); an application for periodically or constantly receiving and/or processing data indicative of the location of other nearby vehicles 108, 110 to determine the proximity of other nearby vehicles 108, 110 to vehicle 106; an application for periodically or constantly requesting, receiving and/or processing data indicative of the operational mode (e.g., autonomous, semi-autonomous, or manual) and/or switches in the operational mode of other nearby vehicles 108, 110; an application for periodically or constantly receiving data indicative of the operational behavior (e.g., indicative of erratic operation and/or malfunction) and/or changes in the operational behavior of other nearby vehicles 108, 110; an application for triggering alerts for an operator and/or passenger of the vehicle 106 based on indications that other nearby vehicles 108, 110 are operating in a manual mode and/or switching operational mode, are operating erratically, and/or are otherwise malfunctioning; an application for displaying a user interface for conveying information to and/or receiving input from an operator and/or passenger of the vehicle 106; a vehicle monitoring application for receiving sensor data indicative of the operational mode and/or operational behavior of the vehicle 106; an application for prompting an operator or passenger to change the operational mode of the vehicle 106 and/or automatically changing the operational mode of the vehicle 106 in certain conditions; an environmental monitoring application for receiving data indicative of conditions in which the vehicle 106 is operating, and/or a real-time communication application for communicating information and/or instructions to the back-end components 104, to other vehicles 108, 110, and/or to other external computing systems. Of course, this is not an exhaustive list of the applications 228, and various embodiments and configurations may include additional and/or alternative applications 228.

The on-board computer and/or mobile devices 126, 128 associated with nearby vehicles 108, 110 may include one or more of the features described above as included by the on-board computer 114 and/or mobile device 116, and may function similarly. That is, the on-board computer and/or mobile devices 126, 128 may include, for instance, a display 230, a GPS unit 232, a communication unit 234, an accelerometer 236, one or more other sensors 238, and/or a controller 240. Similar to the controller 216, the controller 240 may include a program memory 242, one or more processors 244, RAM 246, and an I/O circuit 248, all of which may be interconnected via an address/data bus. The program memory 242 may include an operating system 250, data storage 252, and/or a plurality of software applications 254.

Generally speaking, the functionality of these various components of the on-board computers and/or mobile devices 126, 128 may be similar to the analogous components of on-board computer/mobile device 114/116. Of course, in some embodiments, the on-board computers and/or mobile devices 126, 128 associated with nearby vehicles 108, 110 may not be configured for autonomous operational modes, or otherwise may include additional or alternative features (not shown) compared with on-board computer/mobile device 114/116.

In particular, the software applications 254 stored on the program memory 242 of on-board computers and/or mobile devices 126, 128 may in some embodiments be different from the various applications 228 of on-board computer/mobile device 114/116. Generally speaking, the applications 254 may be particularly configured to perform one or more functions related to, inter alia, monitoring the operational mode, operational behavior, and/or location of vehicle 108, 110, and/or facilitating communications between the vehicle 108, 110 and external sources, such as, e.g., vehicle 106. The various software applications 254 may include, for example, an application for monitoring and/or detecting the operational mode (e.g., autonomous, semi-autonomous, manual, etc.) of the vehicle 108, 110; an application for monitoring and/or detecting the operational behavior (e.g., erratic operating, malfunction, etc.) of the vehicle 108, 110; an application for detecting the location of the vehicle 108, 110; and/or an application for periodically and/or constantly transmitting indications of the operational mode, operational behavior, and/or location of the vehicle 108, 110 to external sources such as vehicle 106 and/or its associated components. Of course, this is not an exhaustive list of the applications 254, and various embodiments and configurations may include additional and/or alternative applications 254, including any of the applications 228. Moreover, although eight applications are shown in FIG. 2, the mobile device and/or on-board computers 126/128 may include any number of applications 254.

Figure 3:
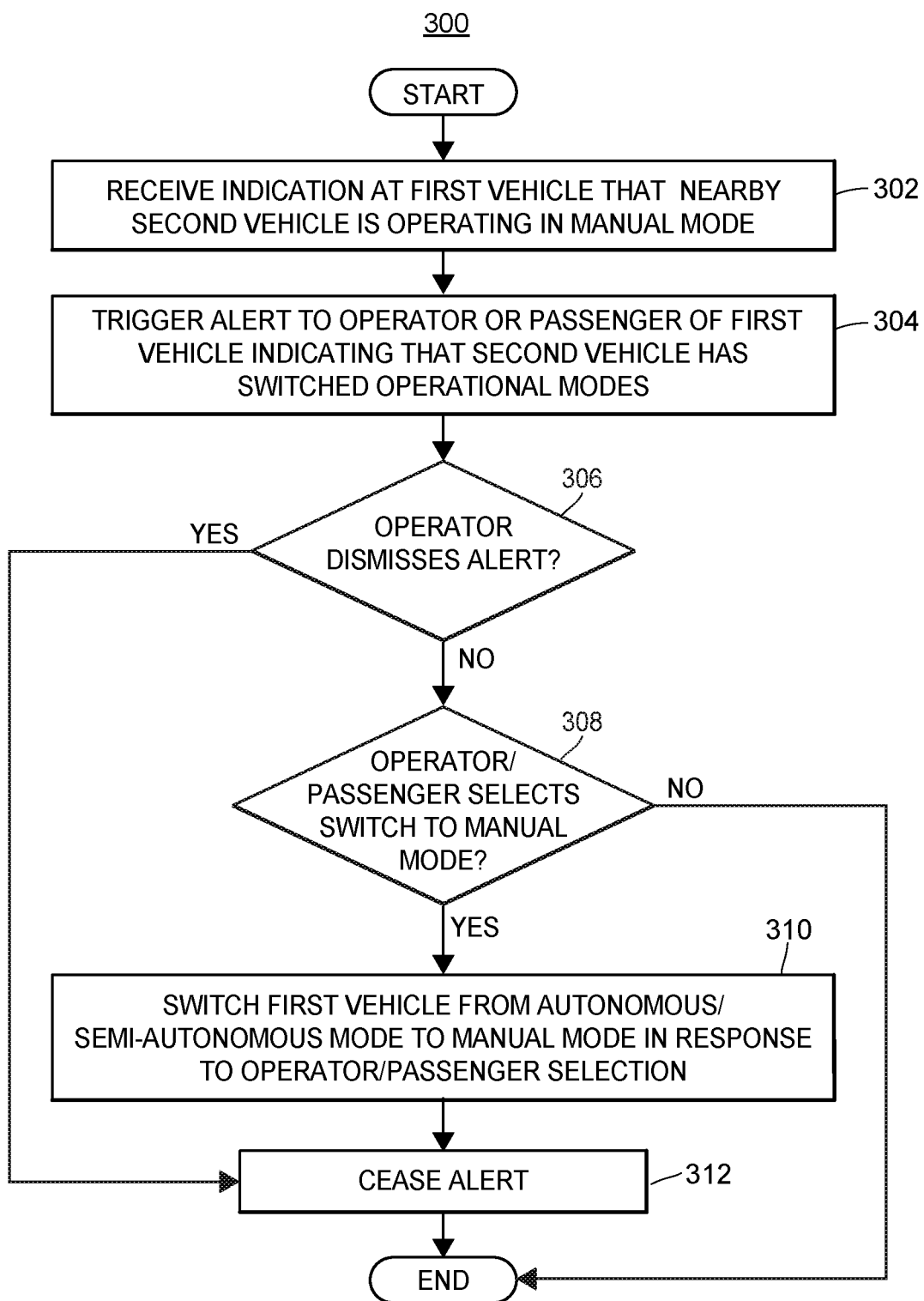
FIG. 3 illustrates a flow diagram of an exemplary method for re-engaging a disengaged operator of a vehicle having one or more autonomous features.

FIG. 3 depicts a flow diagram of an exemplary method 300 for re-engaging a disengaged operator of a vehicle (e.g., vehicle 106) having one or more autonomous features. At block 302, an indication may be received at a first vehicle (e.g., at an on-board computer 114 and/or mobile device 116 associated with the first vehicle) operating in an autonomous or semi-autonomous mode, indicating that a nearby second vehicle (e.g., vehicle 108 and/or vehicle 110) is operating in a manual mode. The first vehicle and the second vehicle may be part of a vehicle network (e.g., network 112) in which signals may be transmitted and received between vehicles, and/or may communicate via any other method as discussed above. In particular, the indication received at the first vehicle may indicate that the second vehicle has switched operational modes from a prior autonomous or semi-autonomous mode to the manual mode in which it is currently operating. The indication received by the first vehicle may further indicate a geographic location of the second vehicle (e.g., a location as determined by a GPS unit 232 or other location functionality of the second vehicle). In particular, the first vehicle may include an on-board GPS functionality (e.g., GPS unit 202) or other means of determining its own geographic location, and a distance between the first and second vehicle may be determined in order to classify the second vehicle as "nearby" or "not nearby." For instance, if the distance between the first and second vehicle is lower than a certain threshold distance which may be preset or set by a user, the second vehicle may be classified as "nearby" the first vehicle. In some embodiments, the indication received by the first vehicle may further indicate, for example, that the second vehicle is operating erratically in the manual mode, or that the second vehicle is malfunctioning, or that the second vehicle has some other operational issue.

At block 304, an alert may be triggered to an operator or passenger of the first vehicle, indicating that the nearby second vehicle has switched operational modes from an autonomous or semi-autonomous operational mode to a manual operational mode. In embodiments, the alert may only be triggered when the second vehicle is sufficiently "nearby," e.g., when the location of the second vehicle is within a certain threshold distance (e.g., within one block, within one mile, etc.) of the location of the first vehicle. The alert may be configured to wake (e.g., by beeping via the internal audio component 122 and/or audio unit 210, or flashing via the internal display component 124 and/or display unit 212) an operator or passenger of the first vehicle who has fallen asleep, or who is otherwise disengaged from the operation of the first vehicle while it is operating in the autonomous or semi-autonomous mode. For instance, while the first vehicle is operating in the autonomous or semi-autonomous mode, the operator or passenger of the first vehicle may be reading, looking at a mobile device, talking on a phone, talking to another passenger, or in some other way distracted or inattentive to the operation of the vehicle. When in such a disengaged state, the operator or passenger of the first vehicle may be, for example, inattentive to nearby manually operating vehicles, traffic conditions, road conditions, weather conditions, pedestrians, or any other considerations that may be relevant should the operator or passenger need to operate the first vehicle in a manual mode. In embodiments, the alert may be elevated in instances when the second vehicle is operating erratically in the manual mode or when the second vehicle is malfunctioning in some way. The elevated alert may be more prominent in some way than the original alert (e.g., louder, brighter, more frequent, or any other suitable way of indicating an elevated alert).

The operator or passenger may be presented with an option to dismiss the alert. The option to dismiss the alert may be, for instance, a notification displayed to the operator or passenger via a user interface of an electronic device, including an option for selection of dismissal. In other embodiments, the operator or passenger may dismiss the alert via a voice command, a gesture, pressing a button within the vehicle, or some other suitable indication that the operator or passenger is aware of the alert, which may be, for instance, detected by sensors 118 and/or 206. For instance, the dismissal of the alert by the operator or passenger may indicate that the operator or passenger is awake and aware that there is a nearby vehicle operating in a manual mode (or operating erratically, or malfunctioning, etc.) If the alert is dismissed by an operator or passenger of the first vehicle (block 306, YES), the alert may be ceased (block 312). If the alert is not dismissed by the operator or passenger of the first vehicle (block 306, NO), the alert may persist, and the method may proceed to other functionalities. In some embodiments, the alert may become more prominent (e.g., louder, brighter, more frequent, etc.) as time passes without an indication of a response by the operator or passenger. For instance, after one minute with no response, the volume of an audible alert may increase, or a visual alert may begin to flash.

The operator or passenger may be presented with an option and/or recommendation to switch the first vehicle from an autonomous or semi-autonomous mode to a manual mode. For example, the option may appear as a notification of a mobile device and/or on-board computer user interface with means for the operator or passenger to enter a response. In some examples, the operator or passenger may choose to operate in the manual mode in instances when other nearby vehicles (e.g., the second vehicle) are operating in manual mode, in order to be able to appropriately respond to less predictable manual drivers in traffic. In other examples, the operator or passenger way choose to operate in the manual mode in instances where other nearby vehicles (e.g., the second vehicle) are operating in manual mode in order to appropriately respond to whatever other reason triggered the other vehicles to operate in manual mode, e.g., unusual weather conditions, unusual traffic conditions, unusually large numbers of pedestrians, or any other situations in which manual operation may be more appropriate than autonomous or semi-autonomous operation. In still other examples, of course, the operator or passenger may choose to continue operating the vehicle in an autonomous and/or semi-autonomous mode despite the option and/or recommendation to switch (e.g., indicate dismissal as discussed above.) If the switch to manual mode is selected by the operator or passenger (block 308, YES), the vehicle may be switched from the autonomous or semi-autonomous mode to the manual mode in response to the selection (block 310), and in embodiments the alert may be ceased in response to the selection (block 312). Otherwise, if the switch to manual mode is not selected by the operator or passenger (block 308, NO), the vehicle may remain in the autonomous mode and the method 300 may end.

In some embodiments, an indication may be received by the first vehicle indicating that the second vehicle that was operating in a manual mode has switched back to an autonomous or semi-autonomous mode. In response to this indication, the alert may be ceased. Similarly, an indication may be received by the first vehicle indicating that the second vehicle is no longer operating erratically, or is no longer malfunctioning, and in response to this indication, the alert may no longer be elevated, or may cease. In some embodiments, the alert may cease if an indication is received by the first vehicle indicating that the second vehicle operating in the manual mode is no longer nearby. For instance, in some embodiments, the alert may cease if the second vehicle is no longer within a threshold distance proximity of the first vehicle, even if the second vehicle continues to operate in the manual mode (or operate erratically, or malfunction, etc.) The threshold distance may be pre-set or may be set by an operator or passenger. In such embodiments, the operator and/or passenger may independently select, and/or may be presented with a recommendation and/or option to select, to switch the vehicle back to an autonomous and/or semi-autonomous mode (e.g., because operating conditions may have become more safe and/or more predictable).

Figure 4:
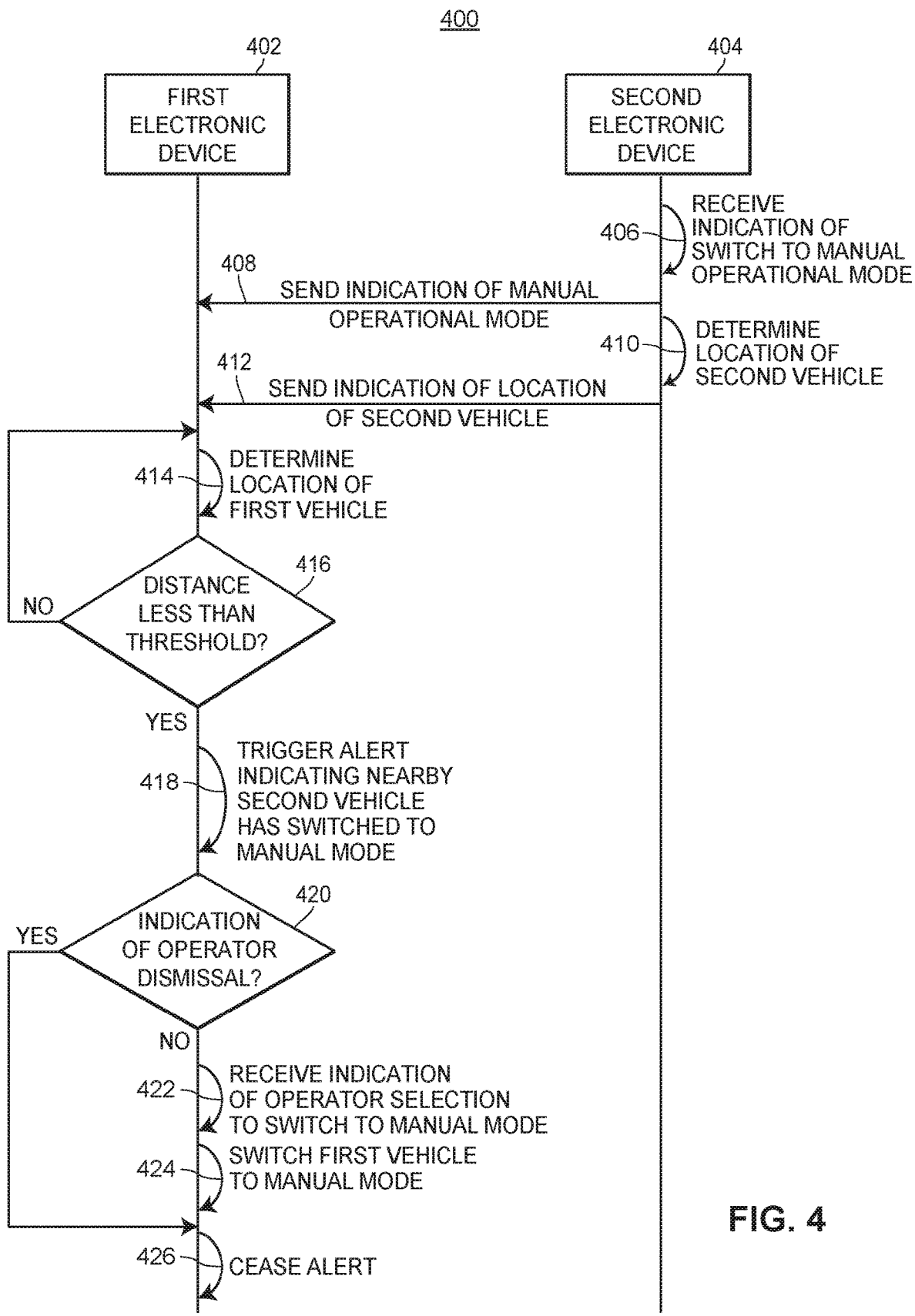
FIG. 4 illustrates a signal diagram associated with exemplary technology for re-engaging a disengaged operator of a vehicle having one or more autonomous features.

FIG. 4 illustrates a signal diagram 400 associated with exemplary technology for re-engaging a disengaged operator of a vehicle having one or more autonomous features. The signal diagram 400 includes a first electronic device 402 (such as, e.g., on-board computer 114 and/or mobile device 116), associated with a first vehicle (e.g., vehicle 106) operating in an autonomous or semi-autonomous mode, and a second electronic device 404 (e.g., on-board computers and/or mobile devices 126 and/or 128), associated with a second vehicle (e.g., vehicles 108 and/or 110). The first electronic device 402 may be configured to communicate with the second electronic device 404. It should be appreciated that additional or alternative components and/or devices are envisioned.

The signal diagram 400 may begin when the second electronic device 404 receives (406) an indication that the second vehicle has switched to a manual operational mode. Additionally or alternatively, the indication may indicate that the second vehicle only has a manual operational mode. That is, the second vehicle may not have autonomous features, and therefore may not be capable of "switching" to the manual operational mode, but may rather be in the manual operational mode by default. In embodiments, the indication may further include an indication that the second vehicle is operating erratically, or that the second vehicle is malfunctioning. In embodiments, the second electronic device 404 may periodically or constantly receive updated indications of the operational mode of the second vehicle (and/or updated indications of whether the second vehicle is operating erratically or malfunctioning).

The second electronic device 404 may send (408) the indication that the second vehicle is in a manual operational mode to the first electronic device 402. The indication may be sent directly or indirectly, as discussed in greater detail above. In embodiments, the indication may additionally or alternatively include the indication that the second vehicle is operating erratically, or that the second vehicle is malfunctioning. The second electronic device 404 may automatically send the indication to the first electronic device 402 in real-time or near real-time as the indication is received, and/or the second electronic device 404 may send the indication in response to a request from the first electronic device 402. In embodiments, the second electronic device 404 may periodically send updated indications of the operational mode of the second vehicle (and/or indications of whether the second vehicle is operating erratically or malfunctioning) to the first electronic device 402. The indication may be sent directly or indirectly, via a network or via any short-range communication functionality, as discussed in detail above with respect to FIG. 1.

Additionally, the second electronic device 404 may determine (410) a geographic location of the second vehicle. The location of the second electronic device 404 may be used as a proxy for the location of the second vehicle. The location may be determined using a GPS unit (e.g., GPS unit 232), or any other suitable means of determining location. Additionally or alternatively, the location of the second vehicle may be determined by another device or functionality, and may be sent to the second electronic device 404 automatically or in response to a request by the second device 404. In embodiments, the second electronic device 404 may periodically determine an updated location of the second vehicle.

The second electronic device 404 may send (412) an indication of the location of the second vehicle to the first electronic device 402. As with the indication of the manual operational mode of the second vehicle, the second electronic device 404 may automatically send the indication of the location of the second vehicle to the first electronic device 402 in real-time or near real-time as the indication is received, and/or the second electronic device 404 may send the indication in response to a request from the first electronic device 402. The indication may be sent directly or indirectly, via a network or via any short-range communication functionality, as discussed in detail above with respect to FIG. 1. In embodiments, the second electronic device 404 may periodically send updated indications of the location of the second vehicle to the first electronic device 402.

The first electronic device 402 may determine (414) a location of the first vehicle. The location of the first electronic device 402 may be used as a proxy for the location of the first vehicle. The location may be determined using a GPS module (e.g., GPS unit 202), or any other suitable means of determining location. Additionally or alternatively, the location of the first vehicle may be determined by another device or functionality, and may be sent to the first electronic device 402 automatically or in response to a request by the first electronic device 402. The first electronic device 402 may periodically determine an updated location of the first vehicle (e.g., as the first vehicle moves).

The first electronic device 402 may query (416) whether the distance between the first vehicle and the second vehicle is less than a certain threshold distance (e.g., one block, one mile). The threshold distance may be pre-set or may be set by a vehicle operator, vehicle manufacturer, etc. If the distance is not less than the certain threshold distance (416, NO), then the second vehicle may be classified as "not nearby" the first vehicle. In embodiments, the respective locations of both vehicles may be periodically determined, the first electronic device 402 may repeatedly query (416) whether the distance between the first vehicle and the second vehicle is less than the certain threshold distance. If the distance between the first vehicle and the second vehicle is less than the threshold distance (416, YES), then the second vehicle may be classified as "nearby" the first vehicle.

The first electronic device 402 may trigger (418) an alert indicating that a nearby second vehicle has switched to a manual operational mode. In particular the alert may be configured to re-engage a disengaged operator or passenger of the first vehicle. For instance, the alert may be configured to wake an operator or passenger of the first vehicle who has fallen asleep, or to cause a distracted operator or passenger to refocus on traffic or road conditions. The alert may be a light, sound, vibration, user interface display, or any other suitable means of alerting an operator or passenger of the first vehicle.

The first electronic device 402 may query (420) whether there has been an indication of an operator dismissal of the alert (i.e., indicating a re-engagement of the operator), such as, for instance, a voice command, a gesture, a pressed button, or a command input to a user interface. If the first electronic device 402 receives an indication of dismissal by the operator or passenger of the first vehicle (420, YES), the first electronic device 402 may cease (426) the alert. If the first electronic device 402 receives no indication of dismissal by the operator or passenger of the first vehicle (420, NO), the electronic device 402 may continue the alert (e.g., the alert may persist). In some embodiments, the first electronic device 402 may periodically elevate the alert (e.g., make the alert louder, brighter, more frequent, etc.) as time passes without receiving an indication of dismissal by a passenger or operator of the first vehicle. In additional or alternative embodiments, the first electronic device 402 may elevate the alert upon receiving from the second electronic device 404 an indication that the second vehicle is operating erratically, or malfunctioning.

The first electronic device 402 may receive (422) an indication that an operator or passenger of the first vehicle has selected to switch the first vehicle to a manual operational mode. In some embodiments, the indication may be a response to a first electronic device 402 query as to whether the first vehicle should be switched to a manual operational mode (e.g., a notification of a user interface). In response to the indication that the operator or passenger of the first vehicle has selected to switch the first vehicle to the manual operational mode, the first electronic device 402 may switch (424) the first vehicle to the manual mode. Additionally or alternatively, the first electronic device 402 may communicate with an on-board computer and may switch the first vehicle to the manual mode by, for instance, sending an indication to the on-board computer indicating that the operational mode of the first vehicle should be switched.

The first electronic 402 device may cease (426) the alert. As discussed above, the first electronic device 402 may cease the alert in response to the indication of dismissal by the operator or passenger of the first vehicle (420, YES). The first electronic device 402 may additionally or alternatively cease (426) the alert in response to an indication that the operator or passenger of the first vehicle has selected to switch the first vehicle to the manual operational mode. In some embodiments, the first electronic device 402 may cease (426) the alert in response to a determination that the distance between the first vehicle and second vehicle is no longer less than the threshold distance (i.e., a determination that the second vehicle is no longer "nearby"). For instance, the second electronic device 404 may periodically or constantly send (412) updated indications of the location of the second vehicle, and the first electronic device 402 may periodically or constantly determine (414) an updated location of the first vehicle, and may query (416) whether the distance between the first vehicle and the second vehicle is still less than the threshold distance. In additional or alternative embodiments, the first electronic device 402 may cease (426) the alert in response to an indication that the second vehicle is no longer in the manual operational mode. For instance, the second electronic device 404 may periodically send (408) updated indications of the operational mode of the second vehicle to the first electronic device 402, and if the operational mode of the second vehicle is autonomous or semi-autonomous, the first electronic device 402 may cease (426) the alert.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A method, comprising:
   triggering, by a processor, an alert provided via a user interface associated with a first vehicle operating in an autonomous mode, only when a second vehicle near the first vehicle is operating in a manual mode, the alert including a safety recommendation recommending that a user select an option, included in the alert, to switch the first vehicle from the autonomous mode to a manual mode;
   receiving, by the processor, an indication of a selection, by the user, via the user interface, of the option included in the alert to switch the first vehicle from the autonomous mode to the manual mode; and
   switching, by the processor, the first vehicle from operating in the autonomous mode to operating in the manual mode in response to the selection.

2. The method of claim 1, wherein the indication received by the first vehicle further indicates that the second vehicle has switched operational modes from a prior autonomous or semi-autonomous mode to a current manual mode.

3. The method of claim 1, wherein the indication that the nearby second vehicle is operating in the manual mode further indicates that the second vehicle is driving erratically, and further comprising:
   triggering, by the processor, an elevated alert to the user indicating that the second vehicle is driving erratically.

4. The method of claim 1, wherein the indication that the nearby second vehicle is operating in the manual mode further indicates that the second vehicle is malfunctioning, and further comprising:
   triggering, by the processor, an elevated alert to the user indicating that the second vehicle is malfunctioning.

5. The method of claim 1, wherein the alert is configured to wake the user who is asleep.

6. The method of claim 1, further comprising:
   ceasing, by the processor, the alert in response to a dismissal of the alert by the user.

7. The method of claim 1, further comprising:
   ceasing, by the processor, the alert in response to the selection by the user to switch operational modes.

8. The method of claim 1, further comprising:
   receiving, by the processor within the first vehicle, an indication that the second vehicle has switched from operating in the manual mode to operating in an autonomous or semi-autonomous mode; and
   ceasing, by the processor, the alert in response to the indication that the second vehicle has switched from operating in the manual mode to operating in the autonomous or semi-autonomous mode.

9. The method of claim 1, further comprising:
   receiving, by the processor within the first vehicle, an indication that the second vehicle is no longer nearby; and
   ceasing, by the processor, the alert in response to the indication that the second vehicle is no longer nearby.

10. An electronic device, comprising:
    a memory configured to store non-transitory computer executable instructions; and
    a processor configured to interface with the memory, and configured to execute the non-transitory computer executable instructions to cause the processor to:
      trigger an alert provided via a user interface associated with a first vehicle operating in an autonomous mode, only when a second vehicle near the first vehicle is operating in a manual mode, the alert including safety recommendation recommending that a user select an option, included in the alert, to switch the first vehicle from the autonomous mode to a manual mode;
      receive an indication of a selection, by the user, via the user interface, of the option included in the alert to switch the first vehicle from the autonomous mode to the manual mode; and
      switch the first vehicle from operating in the autonomous mode to operating in the manual mode in response to the selection.

11. The electronic device of claim 10, wherein the indication received by the first vehicle further indicates that the second vehicle has switched operational modes from a prior autonomous or semi-autonomous mode to a current manual mode.

12. The electronic device of claim 10, wherein the indication that the nearby second vehicle is in the manual mode further indicates that the second vehicle is driving erratically, and
wherein the computer executable instructions further cause the processor to:
trigger an elevated alert to the user indicating that the second vehicle is driving erratically.

13. The electronic device of claim 10, wherein the indication that the nearby second vehicle is in the manual mode further indicates that the second vehicle is malfunctioning, and
wherein the computer executable instructions further cause the processor to:
trigger an elevated alert to the user indicating that the second vehicle is malfunctioning.

14. The electronic device of claim 10, wherein the alert is configured to wake the user who is asleep.

15. The electronic device of claim 10, wherein the computer executable instructions further cause the processor to:
cease the alert in response to a dismissal of the alert by the user.

16. The electronic device of claim 10, wherein the computer executable instructions further cause the processor to:
cease the alert in response to the selection by user to switch operational modes.

17. The electronic device of claim 10, wherein the computer executable instructions further cause the processor to:
receive, at the first vehicle, an indication that the second vehicle has switched from operating in the manual mode to operating in an autonomous or semi-autonomous mode; and
cease the alert in response to the indication that the second vehicle has switched from operating in the manual mode to operating in the autonomous or semi-autonomous mode.

18. The electronic device of claim 10, wherein the computer executable instructions further cause the processor to:
receive, at the first vehicle, an indication that the second vehicle is no longer nearby; and
cease the alert in response to the indication that the second vehicle is no longer nearby.

19. A non-transitory computer-readable storage medium having stored thereon a set of instructions, executable by a processor, the instructions comprising:
triggering an alert provided via a user interface associated with a first vehicle operating in an autonomous mode, only when a second vehicle near the first vehicle is operating in a manual mode, the alert including a safety recommendation recommending that a user select an option, included in the alert, to switch the first vehicle from the autonomous mode to a manual mode;
receiving an indication of a selection, by the user, via the user interface, of the option included in the alert to switch the first vehicle from the autonomous mode to the manual mode; and
switching the first vehicle from operating in the autonomous mode to operating in the manual mode in response to the selection.

20. The non-transitory computer-readable storage medium of claim 19, the instructions further comprising one or more of:
ceasing the alert in response to a dismissal of the alert by the user, or
ceasing the alert in response to the selection by the user to switch operational modes.

* * * * *